United States Patent
Yu et al.

(10) Patent No.: US 9,148,434 B2
(45) Date of Patent: Sep. 29, 2015

(54) DETERMINING POPULATED IP ADDRESSES

(75) Inventors: Fang Yu, Sunnyvale, CA (US); Yinglian Xie, Cupertino, CA (US); Chi-Yao Hong, Urbana, IL (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 475 days.

(21) Appl. No.: 13/528,862

(22) Filed: Jun. 21, 2012

(65) Prior Publication Data

US 2013/0347113 A1  Dec. 26, 2013

(51) Int. Cl.
G06F 15/173 (2006.01)
H04L 29/06 (2006.01)
G06F 21/57 (2013.01)

(52) U.S. Cl.
CPC ............ H04L 63/104 (2013.01); G06F 21/577 (2013.01); H04L 63/1408 (2013.01); *G06F 2221/2101* (2013.01)

(58) Field of Classification Search
CPC ............ H04L 63/1408; H04L 63/1416; H04L 63/1441; G06F 21/577; G06F 21/60
USPC .............. 709/226, 203, 223, 224; 726/22, 24, 726/4–7, 2
See application file for complete search history.

(56) References Cited

U.S. PATENT DOCUMENTS

| | | | |
|---|---|---|---|
| 7,962,510 B2 | 6/2011 | Najork et al. | |
| 2009/0248790 A1 | 10/2009 | Webb-Johnson | |
| 2009/0300768 A1 | 12/2009 | Krishnamurthy et al. | |
| 2010/0186088 A1 | 7/2010 | Banerjee et al. | |
| 2010/0192201 A1* | 7/2010 | Shimoni et al. | ................... 726/3 |
| 2012/0079592 A1* | 3/2012 | Pandrangi | ....................... 726/22 |
| 2012/0324091 A9* | 12/2012 | Raleigh et al. | ................ 709/224 |
| 2013/0246624 A1* | 9/2013 | MacCarthaigh et al. | ..... 709/226 |

OTHER PUBLICATIONS

Zhang, et al., "CANTINA: a Content-Based Approach to Detecting Phishing Web Sites", Retrieved at <<http://www2007.org/papers/paper557.pdf>>, WWW '07 Proceedings of the 16th international conference on World Wide Web, May 8, 2007, pp. 639-648.

Ntoulas, et al., "Detecting Spam Web Pages through Content Analysis", Retrieved at <<http://research.microsoft.com/pubs/65140/www2006.pdf>>, WWW 06 Proceedings of the 15th international conference on World Wide Web, May 23, 2006, pp. 83-92.

(Continued)

*Primary Examiner* — Frantz Jean
(74) *Attorney, Agent, or Firm* — Julie Kane Akhter; Danielle Johnston-Holmes; Micky Minhas

(57) ABSTRACT

A service log of a service provider is analyzed to identify IP addresses used by account holders that are populated IP addresses. Existing information about legitimate and malicious accounts of the service provider is leveraged to determine likely good and bad populated IP addresses based on the accounts that use the populated IP addresses. Features of the good and bad populated IP addresses are used to train a classifier that can identify good and bad populated IP addresses based on features of the populated IP addresses. The classifier may be used to provide security services to the same service provider or different service providers. The services include identifying malicious accounts.

18 Claims, 5 Drawing Sheets

(56) References Cited

OTHER PUBLICATIONS

Guo, et al., "Web Robot Detection Techniques Based on Statistics of Their Requested URL", Retrieved at <<http://ieeexplore.ieee.org/stamp/stamp.jsp?tp=&arnumber=1504093>>, The 9th International Conference on Computer Supported Cooperative Work in Design Proceedings, May 24, 2005, pp. 302-306.
"GML AdaBoost Matlab Toolbox", Retrieved at <<http://graphics.cs.msu.ru/en/science/research/machinelearning/adaboost-toolbox>>, Retrieved Date: Feb. 16, 2012, pp. 2.
"Networks Enterprise Data Acquisition and IP Rotation Services", Retrieved at <<http://x5.net/>>, Retrieved Date: Feb. 16, 2012, p. 1.
"Quova", Retrieved at <<http://www.quova.com/>>, Retrieved Date: Feb. 16, 2012, pp. 7.
"ToR Network Status", Retrieved at <<http://torstatus.blutmagie.de/>>, Retrieved Date: Feb. 16, 2012, pp. 39.
Brutlag, Jake D., "Aberrant Behavior Detection in Time Series for Network Monitoring", Retrieved at <<http://citeseerx.ist.psu.edu/viewdoc/download;jsessionid=97097EB7786B934B06770ABF31E795EF?doi=10.1.1.109.4884&rep=rep1&type=pdf>>, In USENIX Conference on System Administration, 2000, pp. 9.
Cai, et al., "Understanding Block-Level Address Usage in the Visible Internet", Retrieved at <<http://ccr.sigcomm.org/online/files/p99_0.pdf>>, In Proceedings of the ACM SIGCOMM Conference , Aug. 2010, pp. 99-110.
Casado, et al., "Peering Through the Shroud: The Effect of Edge Opacity on IP-Based Client Identification", Retrieved at <<http://www.cs.princeton.edu/~mfreed/docs/illum-nsdi07.pdf>>, 4th Symposium on Networked Systems Design and Implementation, Apr. 11-13, 2007, pp. 14.
Chang, et al., "LIBSVM: A Library for Support Vector Machines", Retrieved at <<http://140.112.30.28/~cjlin/papers/libsvm.pdf>>, ACM Transactions on Intelligent Systems and Technology, 2011, pp. 1-39.
Daswani, et al., "The Anatomy of Clickbot.A", Retrieved at <<http://citeseerx.ist.psu.edu/viewdoc/download?doi=10.1.1.108.5962&rep=rep1&type=pdf>>, in Usenix Workshop on Hot Topics in Understanding Botnets, 2007, pp. 11.
Dingledine, et al., "ToR: The Second-Generation Onion Router", Retrieved at <<http://citeseerx.ist.psu.edu/viewdoc/download?doi=10.1.1.4.6896&rep=rep1&type=pdf>>, in USENIX Security Symposium, 2004, pp. 17.
Eidnes, et al., "Classless IN-ADDR.ARPA Delegation", Retrieved at <<http://tools.ietf.org/pdf/rfc2317.pdf>>, RFC 2317, Mar. 1998, pp. 1-10.
Fan, et al., "LIBLINEAR: A Library for Large Linear Classification", Retrieved at <<http://www.csie.ntu.edu.tw/~cjlin/papers/liblinear.pdf>>, Journal of Machine Learning Research, 2008, pp. 22.
Haddadi, Hamed., "Fighting Online Click-Fraud Using Bluff Ads", Retrieved at <<http://ccr.sigcomm.org/drupal/files/p22-30v40n2t-haddadiPS.pdf>>, ACM SIGCOMM Computer Communication Review, vol. 40, No. 2, Apr. 2010, pp. 22-25.
Isard, et al., "Dryad: Distributed Data-Parallel Programs from Sequential Building Blocks", Retrieved at <<http://research.microsoft.com/en-us/projects/dryad/eurosys07.pdf>>, In EuroSys, 2007, pp. 14.
John, et al., "Searching the Searchers with SearchAudit", Retrieved at <<http://static.usenix.org/events/sec10/tech/full_papers/John.pdf>>, in USENIX Security, 2010, pp. 1-16.
Jung, et al., "An Empirical Study of Spam Traffic and the Use of DNS Black Lists", Retrieved at <<http://conferences.sigcomm.org/imc/2004/papers/p370-jung.pdf>>, In IMC, 2004, pp. 370-375.
Katz-Bassett, et al., "Towards IP Geolocation Using Delay and Topology Measurements", Retrieved at <<http://conferences.sigcomm.org/imc/2006/papers/p7-bassett.pdf>>, In IMC, 2006, pp. 13.
Klein, David V., "Defending Against the Wily Surfer: Web Based Attacks and Defenses", Retrieved at <<http://static.usenix.org/event/detection99/full_papers/klein/klein.pdf>>, In Usenix Workshop on Intrusion Detection and Network Monitoring, 1999, pp. 14.
Metwally, et al., "Estimating the Number of Users behind IP Addresses for Combating Abusive Traffic", Retrieved at <<http://users.cis.fiu.edu/~lzhen001/activities/KDD2011Program/docs/p249.pdf>>, In KDD, 2011, pp. 249-257.
Nagaraja, et al., "BotGrep: Finding P2P Bots with Structured Graph Analysis", Retrieved at <<http://static.usenix.org/event/sec10/tech/full_papers/Nagaraja.pdf>>, In USENIX Security Symposium, 2010, pp. 1-16.
Salzberg, Steven L., "C4.5: Programs for Machine Learning", Retrieved at <<http://svn.assembla.com/svn/odinIDS/Egio/artigos/SolucoesIA/Firewall/C4_5_programs%20for%20machine%20learning.pdf>>, Morgan Kaufmann Publishers Inc., 1993, pp. 235-240.
Ramachandran, et al., "Revealing Botnet Membership Using DNSBL Counter-Intelligence", Retrieved at <<http://mikk.net/~chris/sruti06_spam.pdf>>, in Usenix Workshop on Steps to Reducing Unwanted Traffic on the Internet (SRUTI), 2006, pp. 1-6.
Stringhini, et al., "BotMagnifier: Locating Spambots on the Internet", Retrieved at <<http://static.usenix.org/event/sec11/tech/full_papers/Stringhini.pdf>>, in USENIX Security Symposium, 2011, pp. 16.
Wang, et al., "Reliability and Security in the CoDeeN Content Distribution Network", Retrieved at <<http://nsg.cs.princeton.edu/publication/codeen_usenix_04.pdf>>, in USENIX ATC, 2004, pp. 14.
Wu, et al., "Probability Estimates for Multi-Class Classification by Pairwise Coupling", Retrieved at <<http://www.csie.ntu.edu.tw/~cjlin/papers/svmprob/svmprob.pdf>>, Journal of Machine Learning Research, 2004, pp. 975-1005.
Xie, et al., "Worm Origin Identification Using Random Moonwalks", Retrieved at <<http://citeseerx.ist.psu.edu/viewdoc/download;jsessionid=C75D1872179DDB1F93D0BFC98FB627A6?doi=10.1.1.85.3526&rep=rep1&type=pdf>>, In IEEE Symposium on Security and Privacy, 2005, pp. 15.
Xie, et al., "How Dynamic are IP Addresses?", Retrieved at <<http://ccr.sigcomm.org/drupal/files/fp179-xie.pdf>>, In SIGCOMM, 2007, pp. 12.
Xie, et al., "Spamming Botnets: Signatures and Characteristics", Retrieved at <<http://www.csd.uoc.gr/~hy558/papers/p171-xie.pdf>>, In SIGCOMM, 2008, pp. 171-182.
Yu, et al., "DryadLINQ: A System for General-Purpose Distributed Data-Parallel Computing Using a High-Level Language", Retrieved at <<http://www.usenix.net/events/osdi08/tech/full_papers/yu_y/yu_y.pdf>>, In OSDI, 2008, pp. 1-5.
Zhang, et al., "Detecting Click Fraud in Pay-Per-Click Streams of Online Advertising Networks", Retrieved at <<http://ieeexplore.ieee.org/stamp/stamp.jsp?tp=&arnumber=4595871>>, In ICDCS, 2008, pp. 77-84.

\* cited by examiner

DETERMINING POPULATED IP ADDRESSES

BACKGROUND

Online services such as web-based email, search, and online social networks are becoming increasingly popular. While these services are used every day by billions of legitimate users, they are also heavily abused by attackers for nefarious activities such as spamming, phishing, and identity theft. To limit the damage of attacks, online service providers often rely on Internet Protocol ("IP") addresses to perform blacklisting and service throttling. While such IP-based techniques work well for IP addresses that are relatively static and related to a few users, they are not effective for IP addresses that are associated with a large number of users or user requests.

These IP addresses that are associated with a large number of users or user requests are referred to herein as Populated IP ("PIP") addresses. They are related, but not equivalent to the traditional concept of proxies, network address translators ("NATs"), gateways, or other middle boxes. On the one hand, not all proxies, NATs, or gateways are PIP addresses. Some may be very infrequently used and thus may not of interest to online service providers.

On the other hand, while some PIP addresses may belong to proxies or big NATs, others are dial-up IP addresses that have high churn rates, or datacenter IP addresses that connect to email service to obtain users' email contacts. Additionally, not all PIP addresses are associated with a large number of actual users. Although many good or trusted PIP addresses like enterprise-level proxies are associated with a large number of actual users, some abused or bad PIP addresses may be associated with few real users but a large number of fake users controlled by attackers. In an extreme case, some untrusted or bad PIP addresses are entirely set up by attackers.

Therefore, identifying PIP addresses and classifying PIP addresses as good or bad may be a useful tool for ensuring the security of online service providers. However, identifying and classifying PIP addresses is a challenging task for several reasons. First, ISPs and other network operators consider the size and distribution of customer populations as confidential and rarely publish their network usage information. Second, some PIP addresses are dynamic, e.g., those at small coffee shops with frequently changing user populations. Third, good PIP addresses and bad PIP addresses can reside next to each other in the IP address space. Fourth, a good PIP address can be temporarily abused.

SUMMARY

A service log of a service provider is analyzed to identify IP addresses used by account holders that are populated IP addresses. Existing information about legitimate and malicious accounts of the service provider is leveraged to determine likely good and bad populated IP addresses based on the accounts that use the populated IP addresses. Features of the good and bad populated IP addresses are used to train a classifier that can identify good and bad populated IP addresses based on features of the populated IP addresses. The classifier is then used to provide security services to the same service provider or different service providers. The services include identifying malicious accounts.

In an implementation, a service log is received from a service provider at a computing device. The service log includes service requests, and each service request is associated with an IP address and an account. Populated IP addresses are determined from the IP addresses by the computing device. A first subset of the determined populated IP addresses that are good is determined based on the accounts of the service requests associated with the populated IP addresses in the service log by the computing device. A second subset of the determined populated IP addresses that are bad is determined based on the accounts of the service requests associated with the populated IP addresses in the service log by the computing device. One or more features for each of the populated IP addresses in the first subset and the second subset are determined. A classifier is trained using the determined one or more features of the populated IP addresses in the first and second subset.

In an implementation, populated IP addresses are received at a computing device associated with a first service provider. Each populated IP address has an associated trust score. Identifiers of a plurality of accounts are received at the computing device. For each account, one or more of the populated IP addresses that are associated with the account are determined by the computing device. One or more malicious accounts from the plurality of accounts are determined based on the one or more populated IP addresses associated with the accounts and the trust scores associated with the one or more populated IP addresses.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
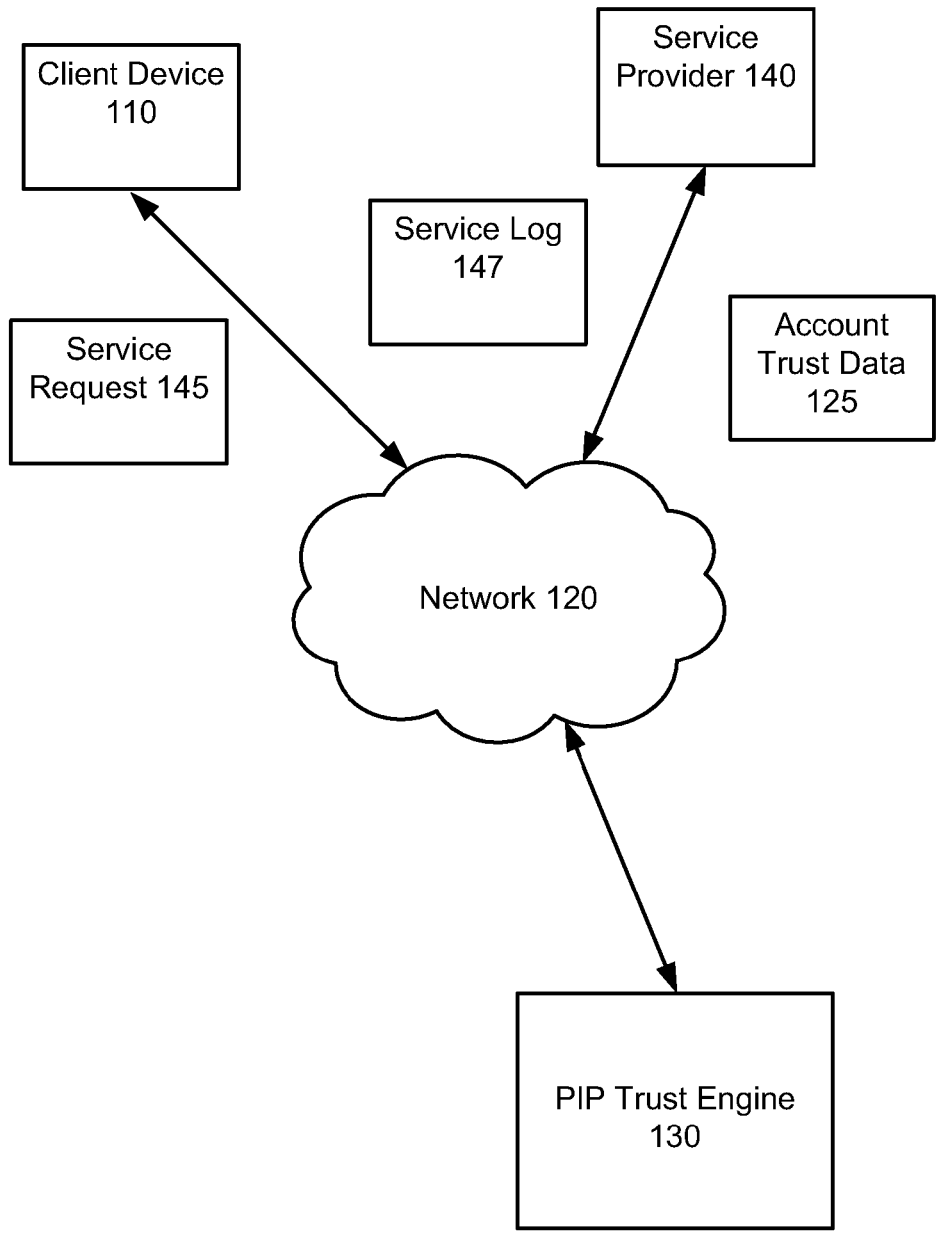
FIG. 1 is an illustration of an example environment for identifying PIP addresses and/or determining whether a PIP address is good or bad.

FIG. 1 is an illustration of an example environment 100 for identifying PIP addresses and/or determining whether a PIP address is good or bad. The environment 100 may include a PIP trust engine 130 in communication with one or more service providers 140 and client devices 110 through a network 120. The network 120 may be a variety of network types including the public switched telephone network (PSTN), a cellular telephone network, and a packet switched network (e.g., the Internet).

The service providers 140 may include any entity (i.e., a person, corporation, or partnership) that provides one or more online services to users of client devices 110. Examples of online services include email services, media related services (e.g., storage, purchase, sharing, and editing services related to images, music, or videos), as well as social networking related services. Other services may be supported.

The service providers 140 may provide one or more services to client devices 110 through accounts. A user may utilize the one or more services associated with the account by providing a service request 145 to the service provider 140. The service request 145 may include information such as an identifier of the account and an identifier of the requested service. For example, a user may establish an email account with the service provider 140, and may request to receive emails received for the account by providing a service request 145 that includes the user name of the account (i.e., identifier of the account), and information such as a password associated with the account.

The service providers 140 may further log or keep track of the service requests 145 in a service log 147. The service log 147 may include an entry for each service request 145 received, along with an identifier of the account associated with the request. In addition, each entry may further include the time when the service request 145 was received along with an IP address associated with the service request 145.

The service providers 140 may generate and maintain account trust data 125. The account trust data 125 may indicate which accounts of the service provider 140 are legitimate accounts, and which accounts are malicious (i.e., not legitimate) accounts. A legitimate account is an account that has met one or more criteria set by the service provider to be considered trusted or legitimate (i.e., not associated with a hacker, bot, or other malicious entity or user). For example, an email service provider 140 may consider an account to be legitimate after it has sent a threshold number of emails to other legitimate user accounts, has been active for a threshold amount of time, or has never originated a spam message. Similarly, a malicious account may be an account that has met one or more criteria set by the service provider 140 to be considered malicious. For example, the email service provider 140 may consider an account to be malicious if it originates spam messages, is associated with other malicious accounts, or is associated with unusual access patterns (i.e., accessed at strange hours). Depending on the service provider 140, a malicious account may be any account that has not yet been proven legitimate. In some implementations, the account trust data 125 may comprise binary values (i.e., legitimate or malicious). Alternatively, the account trust data 125 may comprise ranges of values that indicate how legitimate or malicious each account is. For example, a trust score may be a value between 1 and 5, with 1 representing a very legitimate account and 5 representing a very malicious account.

As will be described further with respect to FIG. 2, the PIP trust engine 130 may determine PIP addresses based on data from the service logs. In some implementations, the PIP addresses may be determined from the IP addresses associated with the requests 145 from the service log 147. For example, the PIP addresses may be the IP addresses that are associated with more than a threshold number of requests 145 and/or accounts in the service log 147.

Once the likely PIP addresses have been determined by the PIP trust engine 130, whether or not the PIP addresses are good or bad may be determined. The PIP addresses may be labeled as either good or bad. In some implementations, the PIP trust engine 130 may determine whether a PIP address is good or bad based on whether the accounts associated with the PIP address in the service log 147 are legitimate or malicious as indicated by the account trust data 125. A good PIP address may be trusted, while a bad PIP address may be considered non-trusted.

The PIP trust engine 130 may train a model, such as a classifier, to label other PIP addresses as either good or bad based on the labeled PIP addresses. The labeled PIP addresses may be used by the PIP trust engine 130 to provide a variety of security services to service providers 140. These services may include the prevention of sign-up abuse, click-fraud, and the identification of one or more malicious or non-trusted accounts.

Figure 2:
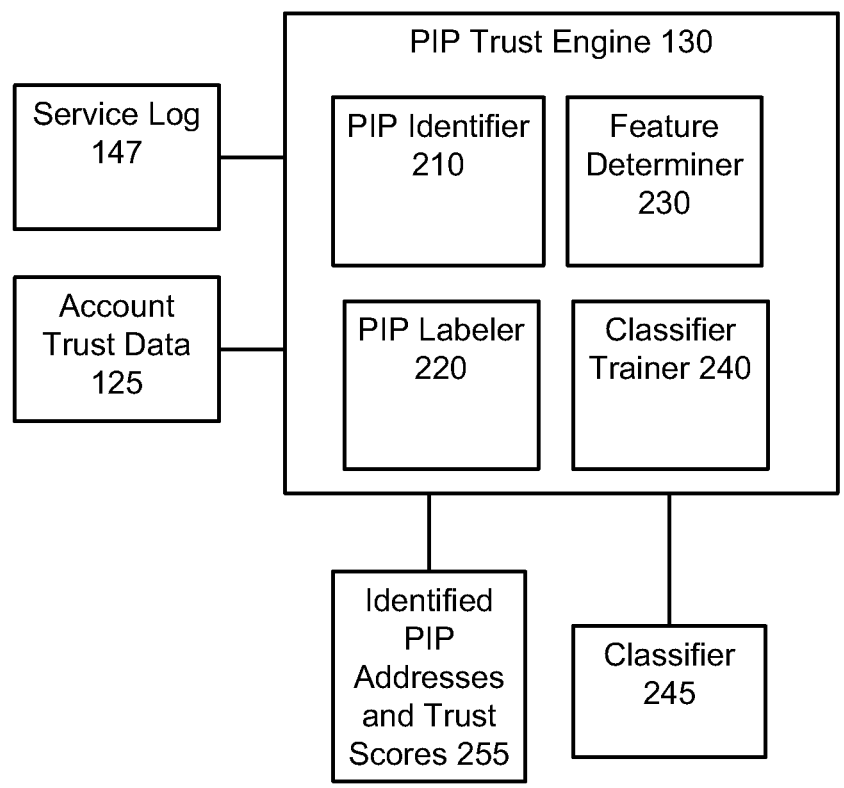
FIG. 2 is an illustration of an example PIP trust engine.

FIG. 2 is an illustration of an example PIP trust engine 130. As illustrated, the PIP trust engine 130 includes a plurality of components including a PIP identifier 210, a PIP labeler 220, a feature determiner 230, and a classifier trainer 240. The PIP trust engine 130, including the various components described herein, may be implemented by one or more computing devices such as the computing system 500 illustrated with respect to FIG. 5.

The PIP identifier 210 may determine one or more IP addresses from the service log 147 that are PIP addresses. In some implementations, a PIP address may be an IP address that originates a large number of service requests 145, or that may be associated with a large number of users or client devices 110. For example, a large organization or university may route some or all internet traffic associated with its users through one or more routers, therefore making the internet traffic of its users appear to come from one or some range of IP addresses. Such IP addresses may be PIP addresses.

In some implementations, the PIP identifier 210 may determine an IP address is a PIP address if it has more than a threshold number of associated service requests 145 in the service log 147. For example, the threshold number of associated service requests 145 may be 100, 200, 300, or 1000. Other thresholds may be used.

However, as may be appreciated, for some types of services providers 140, some users may generate a large number of service requests 145 and may therefore incorrectly appear to be associated with PIP addresses. For example, a single client device 110 that refreshes or checks an email account for new messages frequently may appear to be associated with a PIP address even if the client device is the only client device associated with the IP address. Thus, to avoid such incorrect identification, the PIP identifier 210 may also consider the number of different accounts that are associated with each IP address in the service log 147. In particular, the PIP identifier 210 may determine an IP address is a PIP address if it has more than a threshold number of associated accounts in the service log 147. For example, the threshold number of accounts may be 10, 25, or 50. Other thresholds may be used. Depending on the implementation, the PIP identifier 210 may consider the number of accounts, the number of service requests 145, or some combination of both.

The PIP labeler 220 may label one or more of the determined PIP addresses as good or bad based on the service log 147 and the account trust data 125. In some implementations, the PIP labeler 220 may determine if a PIP address is good (i.e., trusted) or bad (i.e., not trusted) by determining the accounts that are associated with the PIP address in the service log 147. The PIP labeler 220 may determine if a threshold percentage of the accounts associated with the PIP address are either legitimate or malicious as indicated by the account trust data 125. For example, if a majority (>50%) of the accounts associated with a PIP address are legitimate, then the PIP labeler 220 may label the PIP address as good. If a majority of the accounts are malicious, then the PIP labeler 220 may label the PIP address as bad. Other threshold percentages may be used. Depending on the implementation, PIP addresses that are not associated with the threshold percentage of either good or bad accounts may not be labeled by the PIP labeler 220.

The feature determiner 230 may determine one or more features for each of the labeled PIP addresses. The features may be determined from the service log 147. The features may be characteristics or other qualities of the PIP addresses that may be used to train a classifier 245 to evaluate the trustworthiness (i.e., good or bad) of a PIP address based on the features. In some implementations, the features may include what are referred to herein as population features and time series features.

The population features are features that are related to the accounts associated with each PIP address in the service log 147. These population features for a PIP address may include the number of accounts associated with the PIP address, the number of service requests 145 associated with the PIP address, the average number of requests per account associated with the PIP address, the percentage of accounts associated with the PIP address that are new accounts (i.e., younger than a threshold age), a request distribution, and an account-stickiness distribution, for example. The request distribution may show whether the requests associated with the PIP account are well distributed among the accounts associated with the PIP address, or are clustered among a few accounts. The account stickiness distribution may show the number of other PIP addresses that the accounts associated with the PIP address also use to access the service provider 140.

The time series features are features that are related to the access patterns of the service requests 145 received using each PIP address in the service log 147. For example, PIP accounts with a large number of service requests 145 for a short period of time are often malicious and therefore not trusted. In addition, PIP addresses with a large number of service requests 145 late at night or when users are typically sleeping may also be malicious or bad. In some implementations, the feature determiner 230 may divide each day into some number of time units, and may determine the time series features from the service log 147 based on the time units. For example, each day may be divided into eight, three hour time units. Larger or smaller time units may be used depending on the precision sought to be obtained.

The time series features may include the number of time units having greater than a threshold number of service requests 145, a percentage of requests that are received during time units that are at night or are otherwise non-peak for a particular geographic area, the percentage of requests that are received on a weekday or weekend, the distribution of the time between the first and last request received for each account, the distribution of the average amount of time users remain logged into each account, and the overall predictability of the time units when the service requests 145 are received, for example. For example, the predictability may be determined by number and density of anomalies derived from a model such as the Holt-Winders forecasting model. Other models may be used.

In some implementations, the feature determiner 230 may determine PIP addresses that are associated with a block of PIP addresses, and assign each of the PIP addresses in the block the same features. These features are referred to herein as block level features. A block of PIP addresses may be PIP addresses whose IP addresses are neighbors or part of the same administrative domain. For example, often a network interface may use a range or pool of IP addresses for outgoing requests for load balancing purposes. These IP addresses may appear as separate PIP addresses, when fact, they are related to a single entity and may be treated as a single PIP address for feature purposes. In order to identify PIP address blocks, the feature determiner 230 may determine PIP addresses that are under a single domain and that are continuous (i.e., have no gaps between PIP addresses that are filled with non-PIP IP addresses).

The classifier trainer 240 may train the classifier 245 using the labeled PIP addresses and the determined features. The classifier 245 may be a support vector machine. Other models, classifiers, or machine learning techniques may be used. In some implementations, the classifier 245 may generate a trust score based on the features associated with a PIP address. The trust score may be a binary trust score (i.e., good or bad), or may be range of values such as values from 1 to 5, for example.

The PIP trust engine 130 may use the classifier 245 to generate a trust score for each of the identified PIP addresses in the service log 147. The feature determiner 230 may determine features for each of the PIP addresses in the service log 147, and the PIP trust engine 130 may use the classifier 245 to generate the trust scores based on the determined features. The PIP trust engine 130 may provide identified PIP addresses and trust scores 255 to one or more of the service providers 140. At least one service provider may be a different service provider than the service provider that provided the service log 147.

The service providers may use the identified PIP addresses and trust scores 255 to provide various security related services. One such service is the prevention and detection of sign-up abuse. Sign-up abuse is when a malicious user creates an account with a service provider 140. For example, a user may create an account with an email service provider 140 to send spam to one or more users.

In some implementations, when a user creates an account through a PIP address, the service provider 140 may determine the trust score of the PIP address used to create the account. Depending on the trust score, the service provider 140 may close the account, restrict the account (i.e., only allow limited use of the account until the trustworthiness of the account can be verified), provide additional scrutiny to the account, or allow the account.

Another security service is the identification of click-fraud. Click-fraud is when a malicious user creates fraudulent clicks to either generate advertising revenue or to deplete the advertizing budget of a competitor. IP addresses of received clicks may be cross referenced with PIP addresses with trust scores that indicate that the PIP addresses are bad. The clicks associated with these addresses may be discarded, or may be further processed to determine if they are click-fraud. For example, because click-fraud attacks are generated in large numbers they typically include similar features. Thus, the clicks that come from bad PIP addresses and that have similar features may be identified as click-fraud. The features may include a cookie creation date, cookie hash, referral URL (uniform resource locator), form data, or other data that is associated with a click, for example.

Another security service may be to identify or detect existing malicious or non-trusted accounts of a service provider 140. As described above, the account trust data 125 may include identifiers of legitimate and malicious accounts. However, many of the accounts associated with a service provider 140 may not have been classified as either legitimate or malicious, or some of the legitimate accounts may be associated with a malicious user. Accordingly, a service provider 140 may use the identified PIP addresses and trust scores 255 to identity legitimate or malicious accounts, or to identify legitimate accounts that may be malicious.

In some implementations, the service provider 140 may determine the malicious accounts, by determining bad PIP addresses based on the trust scores associated with the PIP addresses. For each account, the service provider 140 may determine if the account is associated with more than a threshold number of bad PIP addresses. Accounts that are associated with more than the threshold number of bad PIP addresses may be determined to be malicious, or may be further scrutinized.

Alternatively or additionally, the service provider 140 may determine naming patterns of accounts that are associated with the bad PIP addresses and may determine legitimate and malicious accounts using the naming patterns. Accounts with names that match one or more of the patterns may be determined to be malicious or may be further scrutinized. Because malicious accounts are often set up automatically, or in bulk, the names for the accounts are often chosen using a pattern. Thus, accounts with names that match the patterns and are associated with bad PIP accounts may be malicious.

Alternatively or additionally, the service provider 140 may determine registration periods associated with the bad PIP addresses and may determine legitimate and malicious accounts using the registrations periods. As described above, malicious accounts are often set up in bulk and automatically, therefore malicious accounts associated with a bad PIP account may have creation or registration dates that are clustered together. Accordingly, accounts that are associated with a bad PIP address and that have registration dates that fall within a determined registration period (e.g., hour, day, week, etc.) may be determined to be malicious or may be further scrutinized.

Figure 3:
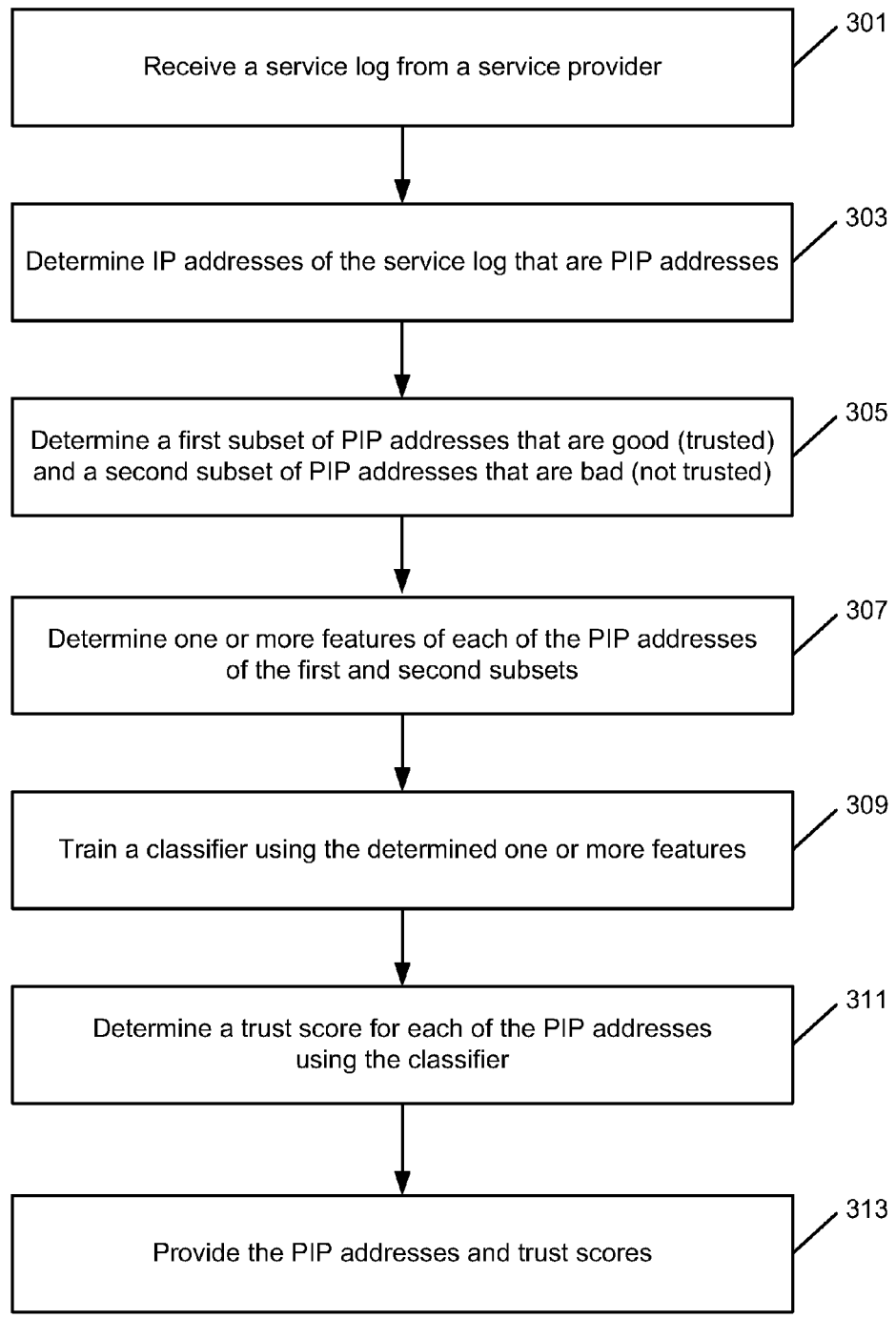
FIG. 3 is an operational flow of an implementation of a method for determining PIP addresses and determining trust scores for the determined PIP addresses.

FIG. 3 is an operational flow of an implementation of a method 300 for determining PIP addresses and determining trust scores for the determined PIP addresses. The method 300 may be implemented by the PIP trust engine 130, for example.

A service log is received from a service provider at 301. The service log 147 may be received from a service provider 140 by the PIP identifier 210 of the PIP trust engine 130. The service log 147 may be a log of service requests 145 received by the service provider 140 from one or more client devices 110. Each service request 145 in the log 147 may be associated with an account and an IP address. In addition, each service request 145 may be associated with a time that the request was received.

IP addresses of the service log that are PIP addresses are determined at 303. The IP addresses of the service log 147 that are PIP addresses may be determined by the PIP identifier 210 of the trust engine 130. In some implementations, an IP address may be a PIP address if it is associated with a service request 145 in the service log 147 more than a threshold number of times and/or associated with a threshold number of different accounts in the service log 147.

A first subset of PIP addresses that are good and a second set of PIP addresses that are bad are determined at 305. The first and the second subsets may be determined by the PIP labeler 220 of the PIP trust engine 130. In some implementations, the first and the second subsets may be determined by the PIP labeler using account trust data 125 received from the service provider 140. The account trust data 125 may identify the accounts of the service provider 140 that are legitimate and the accounts that are malicious. If a PIP address is associated with a service request 145 that is associated with a legitimate account more than a threshold number of times, then the PIP labeler 220 may determine that the PIP address is good. If a PIP address is associated with a service request 145 that is associated with a malicious account more than a threshold number of times, then the PIP labeler 220 may determine that the PIP address is bad.

One or more features of each of the PIP addresses in the first and the second subsets are determined at 307. The features may be determined by the feature determiner 230 of the PIP trust engine 130. The features may be one or more of population features and/or the time series features, for example. Other features may also be used.

A classifier is trained using the determined one or more features at 309. The classifier 245 may be trained by the classifier trainer 240 using the features of the PIP addresses from the first subset and the second subset. In some implementations, the classifier may be a support vector machine. Other types of classifiers may be used.

A trust score is determined for each of the PIP addresses using the classifier at 311. The trust scores may be determined for the PIP addresses by the PIP trust engine 130 using the classifier 245.

The PIP addresses and trust scores are provided at 313. The PIP addresses and trust scores may be the identified PIP addresses and trust scores 255 and may be provided to the same service provider or a different service provider than the service provider that provided the service log 147. The trust scores and PIP addresses may be used to provide one or more security-related services. The services may include detecting one or more malicious accounts, detecting click-fraud, and preventing sign-up abuse, for example. Other security-related services may be supported.

Figure 4:
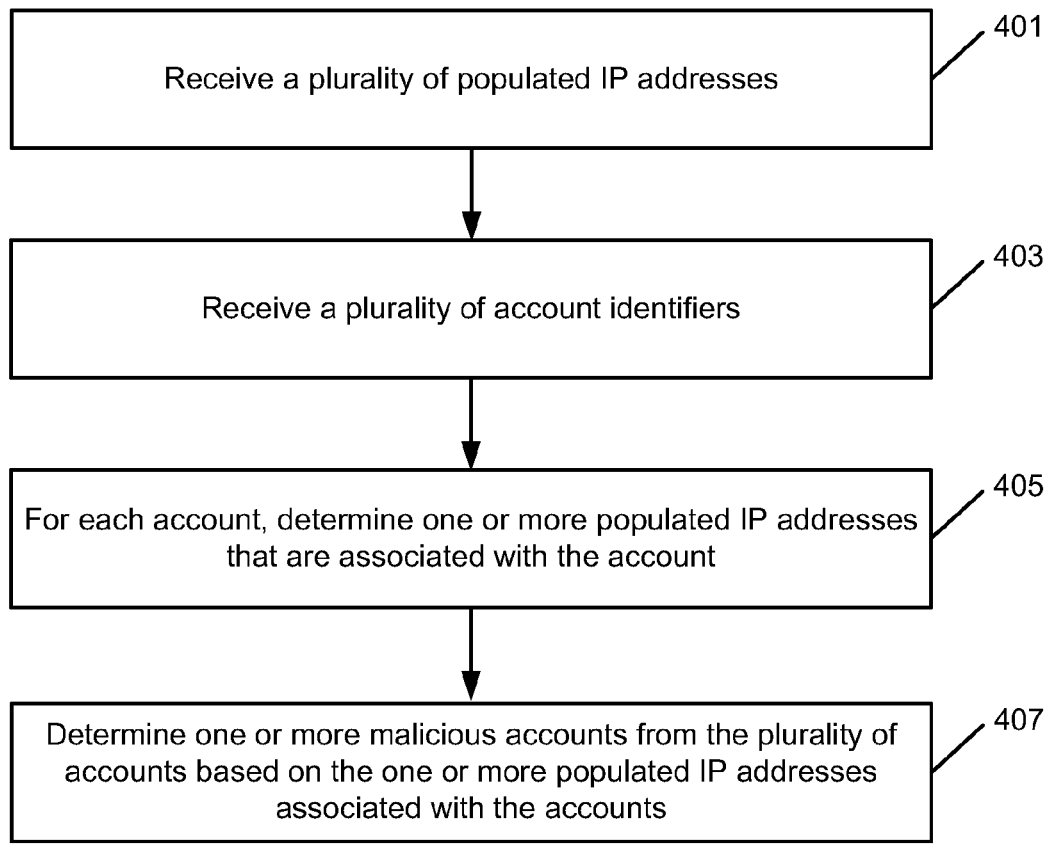
FIG. 4 is an operational flow of an implementation of a method for determining malicious accounts using PIP addresses.

FIG. 4 is an operational flow of an implementation of a method 400 for determining malicious accounts using PIP addresses. The method 400 may be implemented by a service provider 140, for example.

A plurality of PIP addresses is received at 401. The plurality of PIP addresses may be received by a service provider 140. The plurality of PIP addresses may include a trust score for each of the plurality of PIP addresses and may be the identified PIP addresses and trust scores 255.

A plurality of account identifiers is received at 403. The plurality of account identifiers may be received by the service provider 140. The account identifiers may identify accounts associated with the service provider 140.

For each account, one or more PIP addresses that are associated with the account are determined at 405. The one or more PIP addresses may be determined by the service provider 140 by determining the PIP addresses that were used to access the identified accounts.

One or more malicious accounts from the plurality of accounts are determined based on the one or more populated IP addresses associated with the account at 407. The one or more malicious accounts may be determined by the service provider 140. In some implementations, the service provider 140 may determine an account is malicious if it is associated with more than a threshold number of PIP addresses that are bad. Whether a PIP address is bad may be determined based on the trust score associated with the PIP address. Alternatively, or additionally, naming patterns or registration periods associated with the bad PIP addresses may be used to determine malicious accounts.

Figure 5:
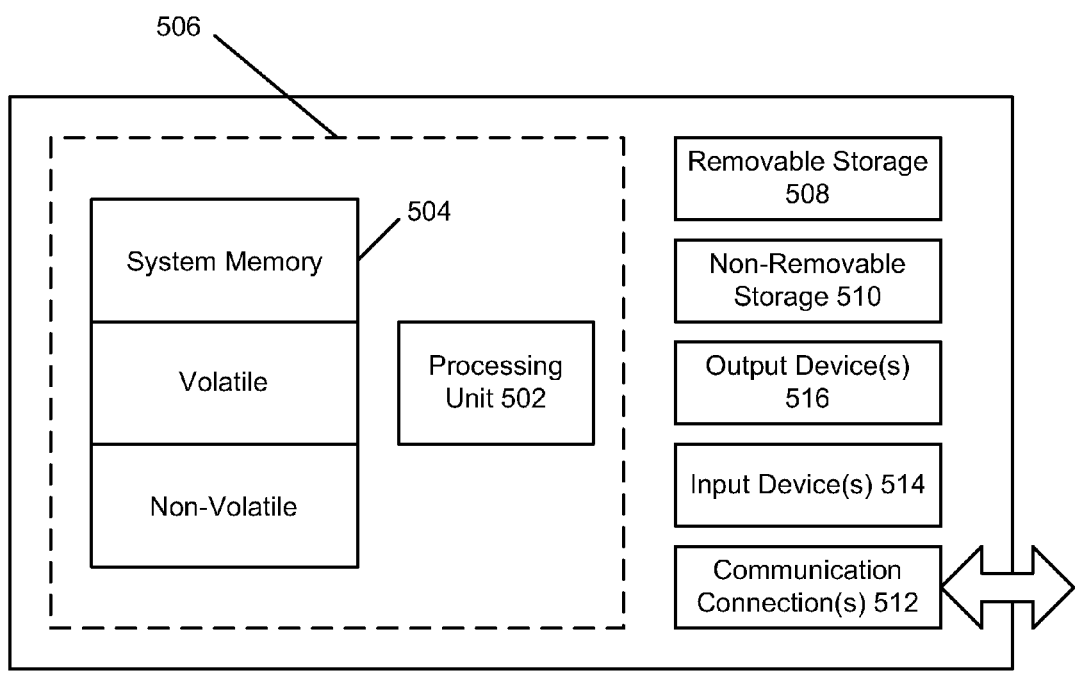
FIG. 5 shows an exemplary computing environment in which example embodiments and aspects may be implemented.

FIG. 5 shows an exemplary computing environment in which example embodiments and aspects may be implemented. The computing system environment is only one example of a suitable computing environment and is not intended to suggest any limitation as to the scope of use or functionality. Other suitable computing environments may include a distributed cluster or cloud computing environment, for example.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing system 500. In its most basic configuration, computing system 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing system 500 may have additional features/functionality. For example, computing system 500 may include additional storage (removable and/or non-removable) including, but not limited to, magnetic or optical disks or tape. Such additional storage is illustrated in FIG. 5 by removable storage 508 and non-removable storage 510.

Computing system 500 typically includes a variety of computer readable media. Computer readable media can be any available media that can be accessed by computing system 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 500. Any such computer storage media may be part of computing system 500.

Computing system 500 may contain communication connection(s) 512 that allow the device to communicate with other devices and/or interfaces. Computing system 500 may also have input device(s) 514 such as a keyboard (software or hardware), mouse, pen, voice input interface, touch interface, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    receiving a service log from a service provider at a computing device, wherein the service log comprises a plurality of service requests and each service request is associated with an IP address of a plurality of IP addresses and an account of a plurality of accounts;
    determining IP addresses of the IP addresses associated with the plurality of service requests that are populated IP addresses by the computing device;
    determining a first subset of the determined populated IP addresses that are trusted based on the accounts of the service requests associated with the populated IP addresses in the service log by the computing device, the determining comprising:
        receiving identifiers of legitimate accounts from the service provider; and
        for each populated IP address, determining if the populated IP address is associated with an account that is a legitimate account more than a first threshold percentage, and if so, determining the populated IP address is trusted;
    determining a second subset of the determined populated IP addresses that are not trusted based on the accounts of the service requests associated with the populated IP addresses in the service log by the computing device;
    determining one or more features for each of the populated IP addresses in the first subset and the second subset by the computing device; and
    training a classifier using the determined one or more features of the populated IP addresses in the first and second subset.

2. The method of claim 1, further comprising:
    generating a trust score for each of the populated IP addresses using the classifier; and
    providing the generated trust scores to the service provider.

3. The method of claim 1, wherein IP addresses that are associated with more than a threshold number of service requests in the service log are populated IP addresses.

4. The method of claim 1, wherein IP addresses that are associated with more than a threshold number of accounts in the service log are populated IP addresses.

5. The method of claim 1, wherein determining the second subset of the determined populated IP addresses that are not trusted based on the accounts of the service requests associated with the populated IP addresses in the service log comprises:
receiving identifiers of malicious accounts from the service provider; and
for each populated IP address, determining if the populated IP address is associated with an account that is a malicious account more than a second threshold percentage, and if so, determining the populated IP address is not trusted.

6. The method of claim 1, wherein the features comprise one or more of population features or time series features.

7. The method of claim 1, wherein the features comprise block level features.

8. The method of claim 1, further comprising:
generating a trust score for each of the populated IP addresses using the classifier; and
providing the generated trust scores and populated IP addresses to a different service provider.

9. The method of claim 8, further comprising detecting one or more malicious accounts of the different service provider using the generated trust scores and populated IP addresses.

10. A method comprising:
receiving a plurality of populated IP addresses at a computing device associated with a first service provider, wherein each populated IP address has an associated trust score;
receiving identifiers of a plurality of accounts at the computing device;
for each account, determining one or more of the plurality of populated IP addresses that are associated with the account by the computing device; and
determining one more malicious accounts from the plurality of accounts based on the one or more populated IP addresses associated with the accounts and the trust scores associated with the one or more populated IP addresses by the computing device by:
determining non-trusted populated IP addresses based on the trust scores associated with the populated IP addresses; and
for each account, determining if the account is associated with more than a threshold number of non-trusted populated IP addresses, and if so, determining that the account is malicious.

11. The method of claim 10, wherein the populated IP addresses are received from a second service provider.

12. The method of claim 10, wherein determining one more malicious accounts from the plurality of accounts based on the one or more populated IP addresses associated with the accounts and the trust scores associated with the one or more populated IP addresses further comprises:
determining non-trusted populated IP addresses based on the trust scores associated with the populated IP addresses;
for each non-trusted populated IP address, determining one or more naming patterns based on a name of each account associated with the non-trusted populated IP address; and
for each account associated with a non-trusted populated IP address, determining if the name of the account matches any of the one or more naming patterns of the associated non-trusted populated IP address, and if so, determining that the account is malicious.

13. The method of claim 10, wherein determining one more malicious accounts from the plurality of accounts based on the one or more populated IP addresses associated with the accounts and the trust scores associated with the one or more populated IP addresses further comprises:
determining non-trusted populated IP addresses based on the trust scores associated with the populated IP addresses;
for each non-trusted populated IP address, determining a registration period based on a registration date for each account associated with the non-trusted populated IP address; and
for each account associated with a non-trusted populated IP address, determining if the registration date of the account is within the registration period of the associated non-trusted populated IP address, and if so, determining that the account is malicious.

14. The method of claim 13, wherein the registration period is one of a month, two weeks, one week, or one day.

15. A system comprising:
at least one computing device; and
a populated IP address engine adapted to:
identify a plurality of populated IP addresses, wherein each of the populated IP addresses is associated with one or more of a plurality of accounts, and a subset of the plurality of accounts are malicious accounts;
determine one or more of the identified plurality of populated IP addresses that are non-trusted populated IP addresses based on accounts associated with the populated IP addresses that are malicious accounts by:
for each identified populated IP address, determining if the identified populated IP address is associated with an account that is a malicious account more than a threshold percentage, and if so, determining the populated IP address is a non-trusted populated IP address;
determine one or more features for each of the non-trusted populated IP addresses; and
train a classifier using the determined one or more features of the non-trusted populated IP addresses.

16. The system of claim 15, wherein the populated IP address engine is further adapted to:
receive a service log; and
identify the plurality of populated IP addresses from the service log.

17. The system of claim 15, wherein the classifier comprises a support vector machine.

18. The system of claim 15, wherein the features comprise one or more of population features, time series features, or block level features.

* * * * *